United States Patent
Ogata et al.

(10) Patent No.: US 12,175,151 B2
(45) Date of Patent: Dec. 24, 2024

(54) VEHICLE DISPLAY DEVICE, VEHICLE, DISPLAY PROCESSING METHOD, AND COMPUTER-READABLE STORAGE MEDIUM

(71) Applicant: TOYOTA JIDOSHA KABUSHIKI KAISHA, Toyota (JP)

(72) Inventors: Ryo Ogata, Toyota (JP); Kento Nagashima, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 299 days.

(21) Appl. No.: 17/941,470

(22) Filed: Sep. 9, 2022

(65) Prior Publication Data

US 2023/0099591 A1    Mar. 30, 2023

(30) Foreign Application Priority Data

Sep. 28, 2021    (JP) ................. 2021-158475

(51) Int. Cl.
*B60K 35/00* (2024.01)
*G06F 3/14* (2006.01)
*B60K 35/23* (2024.01)
*B60K 35/28* (2024.01)
*B60K 35/81* (2024.01)

(52) U.S. Cl.
CPC ............... *G06F 3/14* (2013.01); *B60K 35/00* (2013.01); *B60K 35/23* (2024.01); *B60K 35/28* (2024.01); *B60K 35/81* (2024.01); *B60K 2360/175* (2024.01)

(58) Field of Classification Search
CPC .......... G06F 3/14; B60K 35/00; B60K 35/23; B60K 35/28; B60K 35/81; B60K 2360/175
See application file for complete search history.

(56) References Cited

U.S. PATENT DOCUMENTS

| | | | |
|---|---|---|---|
| 6,570,628 B1 * | 5/2003 | Hirano | B60K 35/00 349/1 |
| 2016/0193923 A1 * | 7/2016 | Kim | B60K 35/50 296/70 |
| 2016/0358997 A1 * | 12/2016 | Bae | H10K 59/38 |
| 2018/0144643 A1 * | 5/2018 | Moravek | G08G 5/0021 |
| 2020/0117187 A1 * | 4/2020 | Kothari | G06F 21/31 |
| 2021/0162865 A1 | 6/2021 | Ogata et al. | |
| 2022/0072955 A1 * | 3/2022 | Ichikawa | G02B 27/0101 |
| 2022/0075588 A1 * | 3/2022 | Yamada | G09G 5/14 |

FOREIGN PATENT DOCUMENTS

JP    2021-88222 A    6/2021

* cited by examiner

*Primary Examiner* — Hongmin Fan
(74) *Attorney, Agent, or Firm* — Oliff PLC

(57) ABSTRACT

A vehicle display device includes: a display section that is provided inside a vehicle cabin and that includes, at a display area, a specific display region that displays plural plans scheduled to be implemented with respect to a vehicle, arranged in an order in which the plural plans are scheduled to be implemented; and a control section configured to cause display of, between a first plan, which is one plan among the plural plans, and a second plan, which is scheduled to be implemented next after the first plan, at the specific display region, an alternative plan that has a possibility of being implemented instead of the first plan.

13 Claims, 10 Drawing Sheets

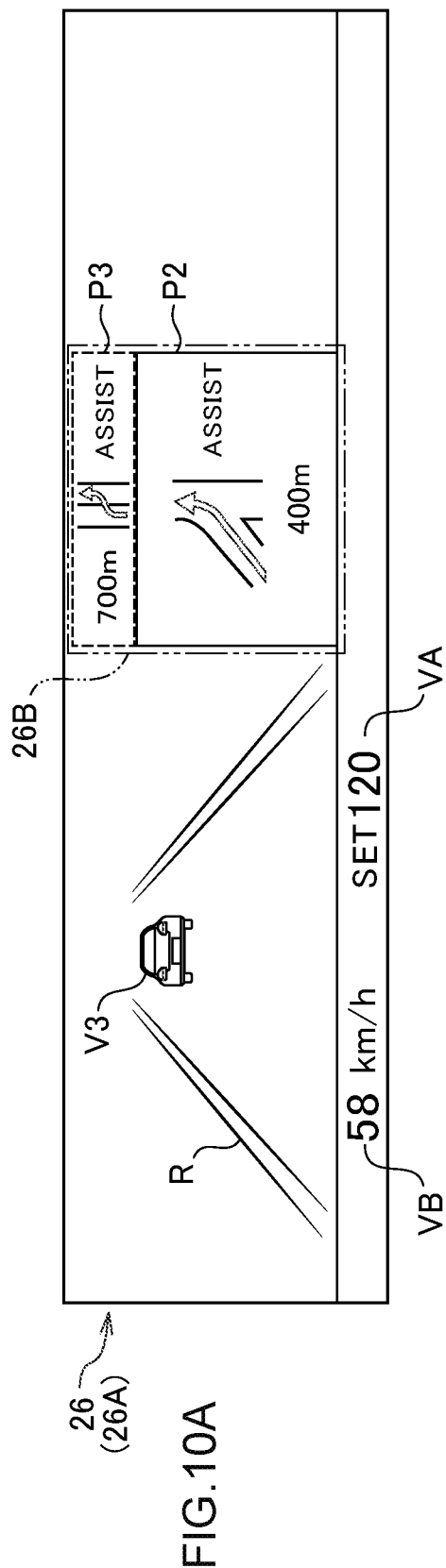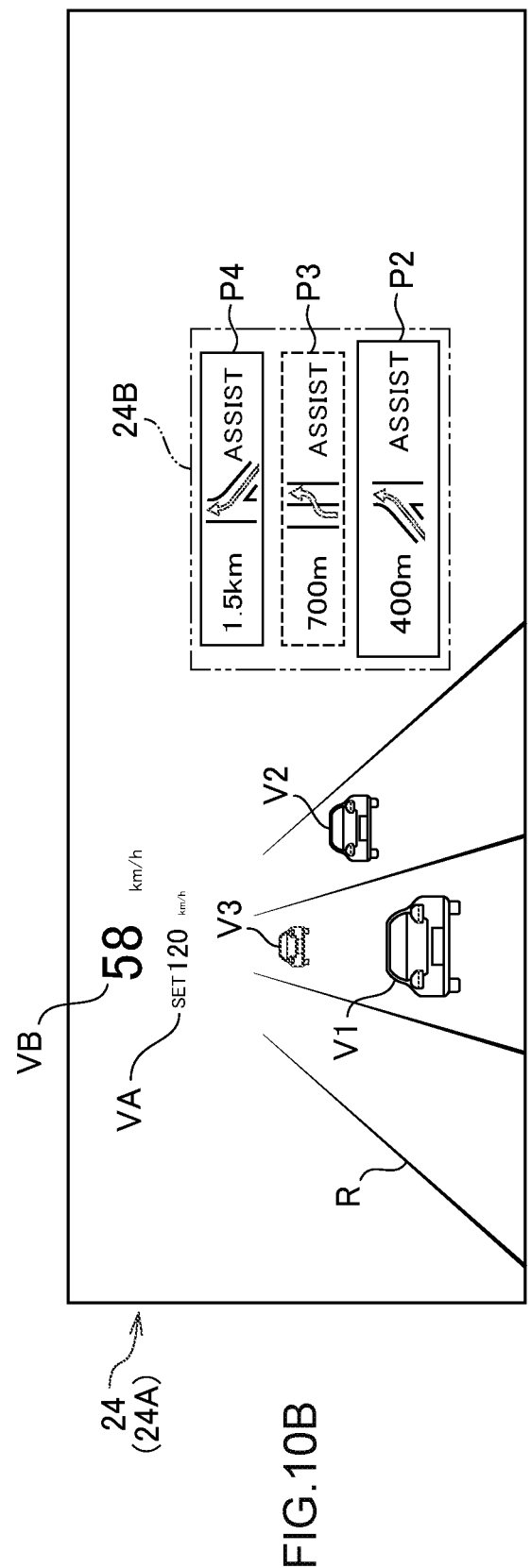

VEHICLE DISPLAY DEVICE, VEHICLE, DISPLAY PROCESSING METHOD, AND COMPUTER-READABLE STORAGE MEDIUM

CROSS-REFERENCE TO RELATED APPLICATION

This application is based on and claims priority under 35 USC § 119 from Japanese Patent Application No. 2021-158475 filed on Sep. 28, 2021, the disclosure of which is incorporated by reference herein.

TECHNICAL FIELD

The present disclosure relates to a vehicle display device, a vehicle, a display processing method, and a computer-readable storage medium.

RELATED ART

Patent Document 1 (Japanese Patent Application Laid-Open (JP-A) No. 2021-088222) discloses a vehicle display device that displays, at a display or a head-up display device, operations (lane change, lane merging, lane branching, and the like) scheduled to be implemented with respect to a vehicle on a route that guides the vehicle to a destination. Displayed in the operation are the distance until the scheduled implementation position of the operation, the type of operation (lane change, lane merging, lane branching, and the like), the type of autonomous driving or manual driving, and the like.

Moreover, in this display device, display processing is performed such that plural operations are displayed arranged in a vertical sequence from the lower side toward the upper side from a position (distance) at which the operation that is scheduled to be performed is close, the lowest operation that has ended is removed, and a new operation is additionally displayed at the top.

In the vehicle display device described in above-mentioned Patent Document 1, even if an operation by autonomous driving control is displayed as an immediate operation, there are cases in which operation cannot be performed by autonomous driving due to road conditions or the like. In such cases, the vehicle display device displays an operation by manual driving instead of an operation by autonomous driving control.

In this case, the notation of the type of operation is not changed on the screen of the display device, and the notation of autonomous driving control is merely changed to the notation of manual driving, such that there is a possibility that an occupant may not be able to understand the change in the display.

In other words, although an occupant must perform the above operation (driving operation) by manual driving, there is a possibility that the situation cannot be understood.

Namely, there is room for improvement in terms of enabling an occupant to understand that the plan scheduled to be implemented, which is displayed at the vehicle display device, has been changed. In this regard, it is desirable for an occupant to be able to understand in advance the possibility of a plan scheduled to be implemented being switched.

SUMMARY

In consideration of the above facts, an object of the present disclosure is to provide a vehicle display device, a vehicle, a display processing method, and a computer-readable storage medium capable of enabling an occupant to understand in advance the possibility of a plan scheduled to be implemented being switched.

A vehicle display device according to a first aspect includes: a display section that is provided inside a vehicle cabin and that includes, at a display area, a specific display region that displays plural plans scheduled to be implemented with respect to a vehicle, arranged in an order in which the plural plans are scheduled to be implemented; and a control section configured to cause display of, between a first plan, which is one plan among the plural plans, and a second plan, which is scheduled to be implemented next after the first plan, at the specific display region, an alternative plan that has a possibility of being implemented instead of the first plan.

In vehicle display device according to the first aspect, the display section is provided inside a vehicle cabin. At the specific display region within the display area of the display section, plural plans scheduled to be implemented with respect to the vehicle are displayed, arranged in the order in which the plural plans are scheduled to be implemented. The control section causes display of, between the first plan, which is one plan among the plural plans, and the second plan, which is scheduled to be implemented next after the first plan, at the specific display region, an alternative plan that has a possibility of being implemented instead of the first plan.

Accordingly, an occupant can understand the possibility of an alternative plan being implemented instead of the first plan scheduled to be implemented simply by looking at the specific display region of the display section. As a result, even if the first plan scheduled to be implemented is changed to the alternative plan, the occupant understands in advance the possibility of the plan being changed, enabling the occupant to understand the change of plan. Namely, an occupant not being able to understand a change of plan is prevented or suppressed.

A vehicle display device according to a second aspect is the vehicle display device according to the first aspect, wherein the first plan is a top plan that is scheduled to be implemented first among the plural plans.

In the vehicle display device according to the second aspect, the control section causes display of an alternative plan with respect to the top plan scheduled to be implemented first among the displayed plural plans. Namely, by displaying an alternative plan for the top plan, which is scheduled to be implemented first, even if the top plan scheduled to be implemented first is changed to the alternative plan, the occupant is aware in advance of the possibility of the top plan being changed, enabling the occupant to understand the change of the top plan. That is, an occupant not being able to understand a change of the top plan is prevented or suppressed.

A vehicle display device according to a third aspect is the vehicle display device according to the first or the second aspect, wherein: the first plan is an operation of the vehicle by driving assistance control; and in a case in which a predetermined condition relating to the first plan is satisfied, the control section is configured to cause display of the alternative plan, which is a manual operation of the vehicle of a same type as the first plan, at the specific display region.

In the vehicle display device according to the third aspect, the first plan is an operation of the vehicle by driving assistance control; and in a case in which a predetermined condition relating to the first plan is satisfied, the control section causes additional display of the alternative plan, which is a manual operation of the vehicle of a same type as the first plan, at the specific display region.

Namely, in a case in which a predetermined condition is satisfied with regard to the operation of the vehicle by driving assistance control, which is the first plan, for example, in a case in which it is found that there is a high possibility that the operation of the vehicle by driving assistance control is not possible, an alternative plan, which is a manual operation of the vehicle of the same type as the first plan, is displayed at the specific display region. This enables an occupant to understand in advance that there is a possibility of switching to manual driving in a case in which the operation of the vehicle according to the first plan (driving assistance control) is difficult.

Accordingly, in a case in which the plan scheduled to be implemented has been changed from the first plan to the alternative plan, the occupant can reliably understand the change of plan, and can perform manual driving calmly.

A vehicle display device according to a fourth aspect is any one of the vehicle display device according to the first aspect to the third aspect, wherein the control section is configured to cause display of the alternative plan in a color that is different from at least the first plan.

In the vehicle display device according to the fourth aspect, the alternative plan is displayed in a color that is different from at least the first plan, in the specific display region. Accordingly, an occupant who has visually checked the specific display region of the display section can intuitively recognize that the alternative plan is not a plan scheduled to be implemented at present, but rather an alternative candidate for the first plan scheduled to be implemented. Moreover, since the alternative plan is displayed next to the first plan vertically, the occupant can easily confirm that the alternative plan is an alternative candidate for the first plan.

A vehicle display device according to a fifth aspect is the vehicle display device according to any one of the first to the fourth aspects, wherein, in a case in which the alternative plan is added and displayed at the specific display region, the control section is configured to cause a last plan, which is a plan scheduled to be implemented last among the plural plans, to be removed from the specific display region.

In the vehicle display device according to the fifth aspect, in a case in which the control section causes insertion (addition) and display of the alternative plan between the first plan and the second plan which are displayed next to each other vertically in the specific display region, by removing the last plan, a space for displaying the alternative plan in the specific display region is secured.

This processing maintains a constant number of plans to be displayed at the specific display region.

A vehicle display device according to a sixth aspect is any one of the vehicle display device according to the first aspect to the fifth aspect, wherein, in a case in which operation of the first plan has started, the control section is configured to cause the alternative plan to be removed from the specific display region.

In the vehicle display device according to the sixth aspect, in a case in which operation of the first plan has started, the control section causes the alternative plan to be removed from the specific display region. Namely, the fact that the operation of the first plan has been started means that the possibility of the alternative plan being implemented instead of the first plan no longer exists. Accordingly, removing the alternative plan that cannot be implemented from the specific display region enables the occupant to be reliably informed that the possibility of the alternative plan being implemented no longer exists.

A vehicle display device according to a seventh aspect is the vehicle display device according to the third aspect, wherein the predetermined condition relating to the first plan is the operation of the vehicle relating to the first plan not starting at a scheduled implementation timing of the first plan.

In the vehicle display device according to the seventh aspect, in a case in which the operation of the first plan cannot be started at a scheduled implementation timing of the first plan, the alternative plan is displayed at the specific display region. Namely, if the operation of the first plan could not be implemented at the scheduled implementation timing, even if the scheduled implementation timing is postponed, there is a high possibility that the operation of the first plan cannot be implemented during this period.

Accordingly, by displaying the alternative plan in a case in which the operation cannot be started at the scheduled implementation timing of the first plan, the occupant can understand the possibility of the alternative plan being implemented instead of the first plan scheduled to be implemented, simply by looking at the specific display region of the display section. As a result, even if the first plan scheduled to be implemented is changed to the alternative plan, the occupant understands in advance the possibility of the plan being changed, enabling the occupant to understand the change of plan. Namely, an occupant not being able to understand a change of plan is prevented or suppressed.

A vehicle display device according to an eighth aspect is the vehicle display device according to the third aspect, wherein the predetermined condition relating to the first plan is a possibility of the operation of the vehicle relating to the first plan not starting at a scheduled implementation timing of the first plan.

In the vehicle display device according to the eighth aspect, in a case in which there is a possibility that the operation of the first plan cannot be started at a scheduled implementation timing of the first plan, the alternative plan is displayed at the specific display region. Namely, in a case in which there is a high possibility that the operation of the first plan cannot be implemented at the scheduled implementation timing, there is a high possibility that the operation of the vehicle according to the first plan cannot be implemented even when it becomes the scheduled implementation timing.

Accordingly, by displaying the alternative plan in a case in which there is a high possibility of not being able to start the operation at the scheduled implementation timing of the first plan, an occupant can understand the possibility of the alternative plan being implemented instead of the first plan scheduled to be implemented simply by looking at the specific display region of the display section. As a result, even if the first plan scheduled to be implemented is changed to the alternative plan, the occupant understands in advance the possibility of the plan being changed, enabling the occupant to understand the change of plan. Namely, an occupant not being able to understand a change of plan is prevented or suppressed.

A vehicle display device according to a ninth aspect is any one of the vehicle display device according to the first aspect to the eighth aspect, wherein the display section is provided at an instrument panel facing a driver's seat.

In the vehicle display device according to the ninth aspect, the display section is provided at an instrument panel facing the driver's seat, enabling the occupant to check the plans in the order in which the plans are scheduled to be implemented without the occupant having to move his/her line of sight significantly during driving.

A vehicle display device according to a tenth aspect is any one of the vehicle display device according to the first aspect to the eighth aspect, wherein the display section is a projection plane projected by a head-up display device.

In the vehicle display device according to the tenth aspect, the display section is a projection plane projected by a head-up display device, and plural plans are displayed on the projection plane at a vehicle upper side in the order in which the plural plans are scheduled to be implemented. This enables the occupant to check plural plans close to scheduled implementation without the occupant having to move his/her line of sight significantly during driving.

A vehicle according to an eleventh aspect includes the vehicle display device according to any one of the first aspect to the tenth aspect.

The vehicle according to the eleventh aspect includes the vehicle display device of any one of the first aspect to the tenth aspect, and therefore only by visually recognizing the alternative plan displayed at the specific display region, it is possible to confirm that there is a possibility that the alternative plan will enter the implementation schedule in place of the first plan. Accordingly, even if the first plan is switched to the alternative plan, the occupant will not be caught unaware.

A display processing method according to a twelfth aspect includes: causing display of plural plans scheduled to be implemented with respect to a vehicle, arranged in an order in which the plural plans are scheduled to be implemented, at a specific display region of a display area at a display section that is provided inside a vehicle cabin; and causing display of, between a first plan, which is one plan among the plural plans, and a second plan, which is scheduled to be implemented next after the first plan, at the specific display region, an alternative plan that has a possibility of being implemented instead of the first plan.

The display processing method according to the twelfth aspect exhibits the same advantageous effects as those of the first aspect.

A program stored in a non-transitory computer-readable storage medium according to a thirteenth aspect is a program that is executable by a computer to perform processing, the processing including: causing display of plural plans scheduled to be implemented with respect to a vehicle, arranged in an order in which the plural plans are scheduled to be implemented, at a specific display region of a display area at a display section that is provided inside a vehicle cabin; and causing display of, between a first plan, which is one plan among the plural plans, and a second plan, which is scheduled to be implemented next after the first plan, at the specific display region, an alternative plan that has a possibility of being implemented instead of the first plan.

The same advantageous effects as those of the first aspect are exhibited by the program according to the thirteenth aspect being implemented by a computer.

As described above, the vehicle display device according to the first aspect to the eighth aspect enables an occupant to understand in advance the possibility of a plan scheduled to be implemented being switched.

The vehicle display device according to the ninth aspect and the tenth aspect enables an occupant to check plans displayed in the order in which the plans are scheduled to be implemented without the occupant having to move his/her line of sight significantly during driving.

The vehicle according to the eleventh aspect enables an occupant to understand in advance the possibility of a plan scheduled to be implemented being switched.

The display processing method according to the twelfth aspect enables an occupant to understand in advance the possibility of a plan scheduled to be implemented being switched.

The non-transitory computer-readable storage medium according to the thirteenth aspect enables an occupant to understand in advance the possibility of a plan scheduled to be implemented being switched.

BRIEF DESCRIPTION OF THE DRAWINGS

FIG. 10A is a diagram illustrating a display example of the second display section that has had the display updated from the state illustrated in FIG. 5A.

FIG. 10B is a diagram illustrating a display example of the first display section that has had the display updated from the state illustrated in FIG. 5B.

DETAILED DESCRIPTION

Figure 1:
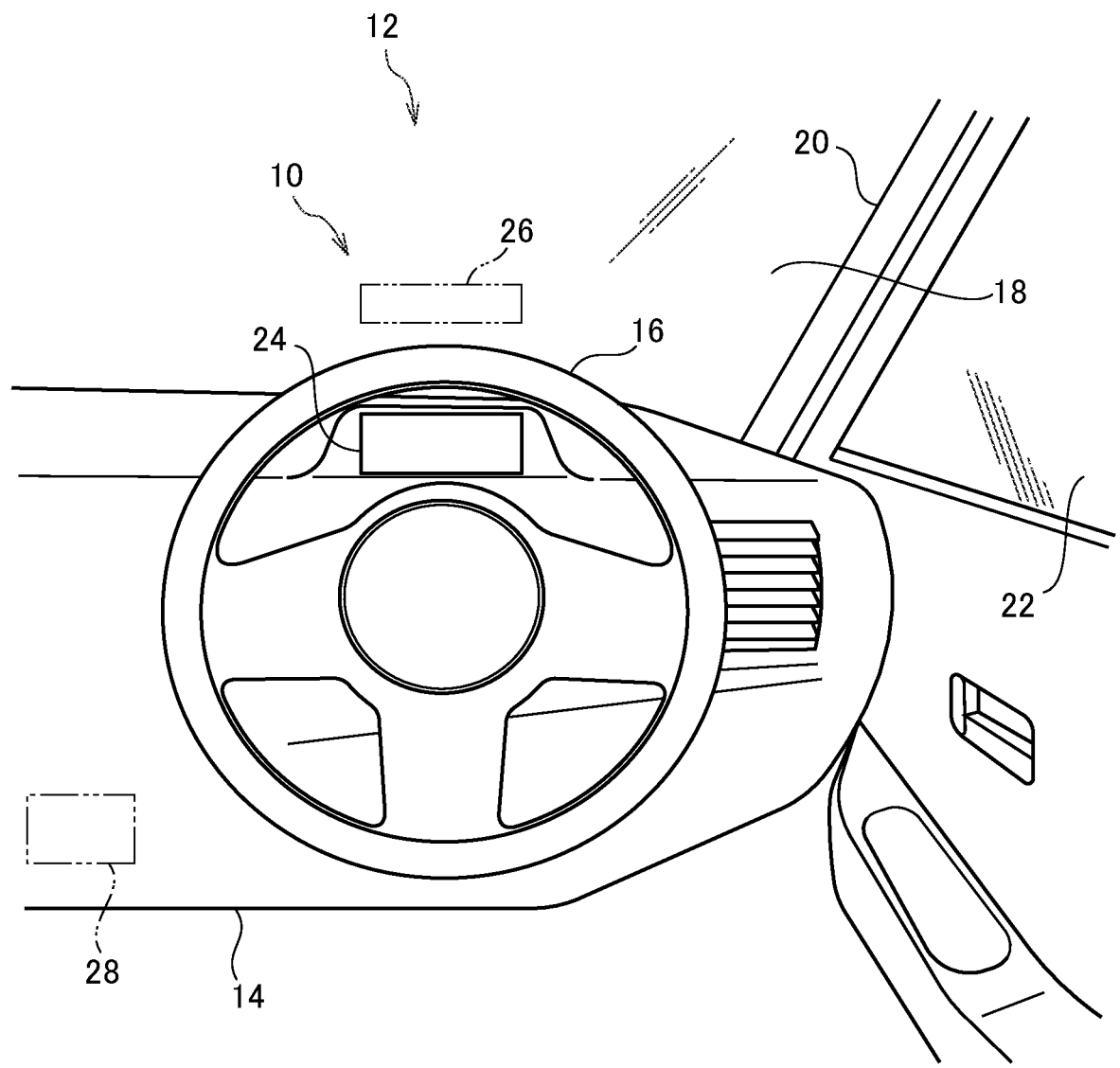
FIG. 1 is a schematic diagram illustrating a front part inside a vehicle cabin, viewed from a vehicle rearward side, of a vehicle to which a vehicle display device according to an exemplary embodiment has been applied.

Explanation follows regarding a vehicle 12 to which a vehicle display device 10 according to an exemplary embodiment has been applied, with reference to the drawings. Note that, as an example, the vehicle 12 of the present exemplary embodiment is configured so as to be capable of switching between autonomous driving and manual driving. As illustrated in FIG. 1, an instrument panel 14 is provided at a front part inside a vehicle cabin of a vehicle 12.

The instrument panel 14 extends in the vehicle width direction, and a steering wheel 16 is provided at a vehicle right side of the instrument panel 14. Namely, in the present exemplary embodiment, as an example, a right hand drive vehicle is configured with a steering wheel 16 provided at the right side, and a driver's seat is installed at the right side of the vehicle.

A windshield glass 18 is provided at a front end part of the instrument panel 14. The windshield glass 18 extends in the vehicle vertical direction and the vehicle width direction to partition the vehicle cabin interior from an exterior of the vehicle cabin.

A vehicle right side end part of the windshield glass 18 is fixed to a front pillar 20 at the vehicle right side. The front pillar 20 extends in the vehicle vertical direction, and the windshield glass 18 is fixed to an inner side end part of the front pillar 20 in the vehicle width direction. Further, a front end part of a front side glass 22 is fixed to an outer side end part of the front pillar 20 in the vehicle width direction. A vehicle left side end part of the windshield glass 18 is fixed to a front pillar (not shown) at the left side of the vehicle.

Here, the instrument panel 14 is provided with a first display section 24. The first display section 24 is provided at the instrument panel 14 facing the driver's seat, and is provided at a position that enters the field of view in a state in which a driver has oriented their line of sight toward the vehicle front.

The windshield glass 18 is provided with a second display section 26. The second display section 26 is set at a vehicle upper side of the first display section 24, and is configured by a projection plane projected by a head-up display device 44 (see FIG. 2). More specifically, a head-up display device 44 is provided further toward a vehicle front side than the instrument panel 14, and an image is projected onto the second display section 26 of the windshield glass 18 from the head-up display device 44.

(Hardware Configuration of the Vehicle Display Device 10)

Figure 2:
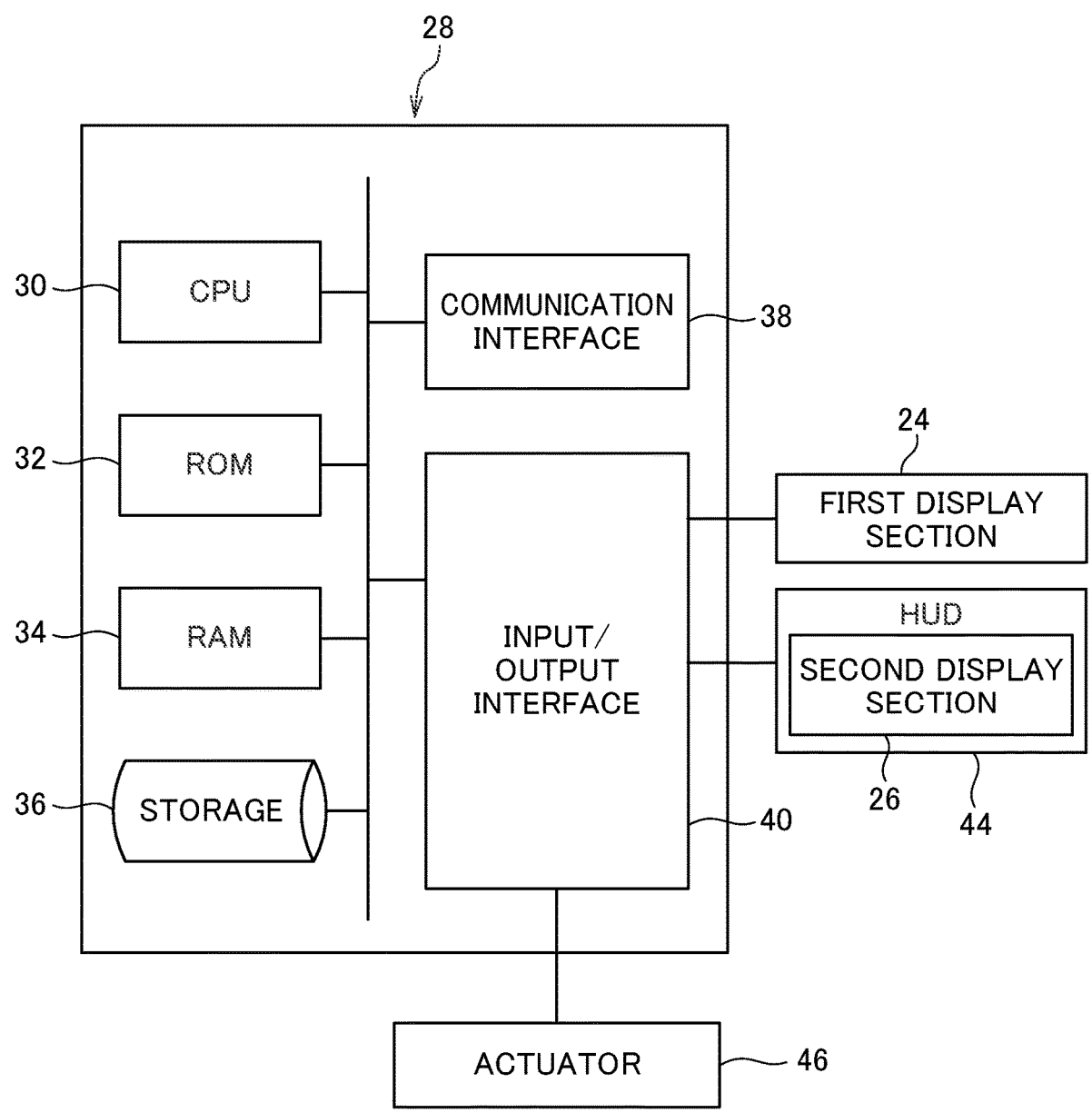
FIG. 2 is a block diagram illustrating a hardware configuration of a vehicle display device according to an exemplary embodiment.

The vehicle 12 is provided with an electronic control unit (ECU) 28 serving as a control section. FIG. 2 is a block diagram illustrating a hardware configuration of the vehicle display device 10. As illustrated in FIG. 2, the ECU 28 of the vehicle display device 10 includes a central processing unit (CPU; serving as a processor) 30, read only memory (ROM) 32, random access memory (RAM) 34, storage 36, a communication interface 38, and an input/output interface 40. These respective configurations are communicably connected to each other via a bus.

The CPU 30 is a central processing unit that executes various programs and controls various components. Namely, the CPU 30 reads a program from the ROM 32 or the storage 36, and executes the program using the RAM 34 as a workspace. The CPU 30 controls the respective configurations described above and performs a variety of computation processing in accordance with the programs stored in the ROM 32 or the storage 36.

The ROM 32 stores various programs and various data. The RAM 34 serves as a workspace that temporarily stores programs and data. The storage 36 is configured by a hard disk drive (HDD) or a solid state drive (SSD), and stores various programs including an operating system, as well as various data. In the present exemplary embodiment, a program for performing display processing, various data, and the like are stored in the ROM 32 or the storage 36.

The communication interface 38 is an interface used by the vehicle display device 10 to communicate with a non-illustrated server and other devices and, for example, a protocol such as Ethernet (registered trademark), LTE, FDDI, or Wi-Fi (registered trademark) is used.

The input/output interface 40 is connected to the first display section 24, the head-up display device 44 that projects an image onto the second display section 26, and an actuator 46. The actuator 46 includes a steering actuator, an accelerator actuator, and a brake actuator, and the steering actuator performs steering of the vehicle 12. The accelerator actuator accelerates the vehicle 12. Further, the brake actuator controls braking in order to decelerate the vehicle 12. Note that non-illustrated sensors, GPS devices, and the like are connected to the input/output interface 40 in order to cause the vehicle 12 to autonomously travel.

(Functional Configuration of the Vehicle Display Device 10)

The vehicle display device 10 implements various functions using the above-described hardware resources. Explanation follows regarding functional configurations implemented by the vehicle display device 10, with reference to FIG. 3.

Figure 3:
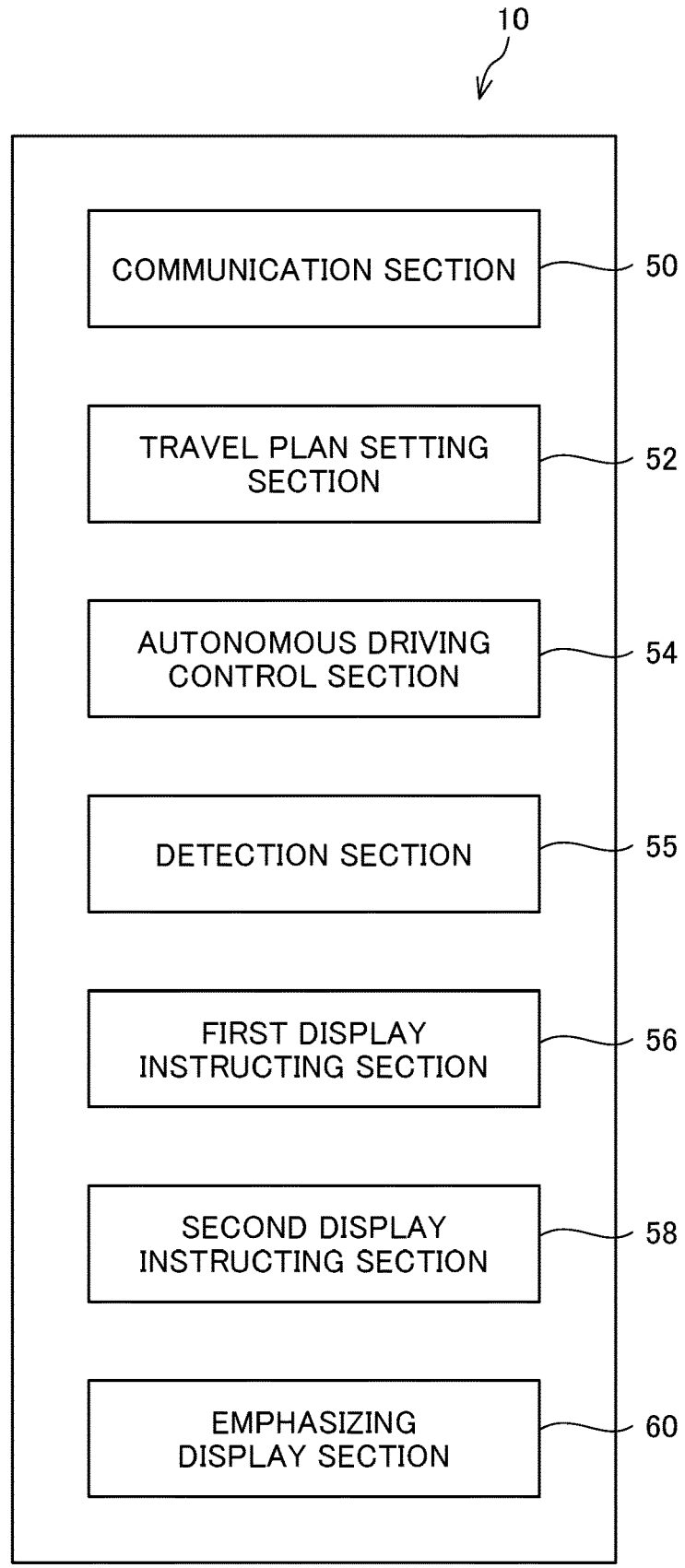
FIG. 3 is a block diagram illustrating a functional configuration of a vehicle display device according to an exemplary embodiment.

As illustrated in FIG. 3, the functional configuration of the vehicle display device 10 includes a communication section 50, a travel plan setting section 52, an autonomous driving control section 54, a detection section 55, a first display instructing section 56, a second display instructing section 58, and an emphasizing display section 60. Note that the respective functional configurations are implemented by the CPU 30 reading and executing programs stored in the ROM 32 or the storage 36.

The communication section 50 transmits and receives data to and from an external server and other devices via the communication interface 38. For example, transmitting and receiving of map data and traffic condition data stored in the server is performed. Moreover, the communication section 50 may be configured to perform inter-vehicle communication with peripheral vehicles.

The travel plan setting section 52 sets a travel plan for the vehicle 12. More specifically, a travel plan from a current location to a destination is set by an occupant inputting a destination.

The autonomous driving control section 54 causes autonomous travel of the vehicle 12 according to a set travel plan, while considering position information and peripheral environment information of the vehicle 12. More specifically, the vehicle 12 is caused to autonomously travel by controlling the actuator 46.

The detection section 55 detects the current position of the vehicle 12 from sensors, GPS devices, and the like, and also detects a drive signal and the like for the actuator 46. The detection section 55 detects whether or not the operation of the plan has been started, for example when the vehicle has passed a scheduled implementation position of the plan.

The first display instructing section 56 causes display of a plan for the vehicle 12 at the first display section 24 based on the travel plan set by the travel plan setting section 52. Explanation follows regarding functionality of the first display instructing section 56, with reference to FIG. 4B, FIG. 5B, and FIG. 6B.

Figure 4A:
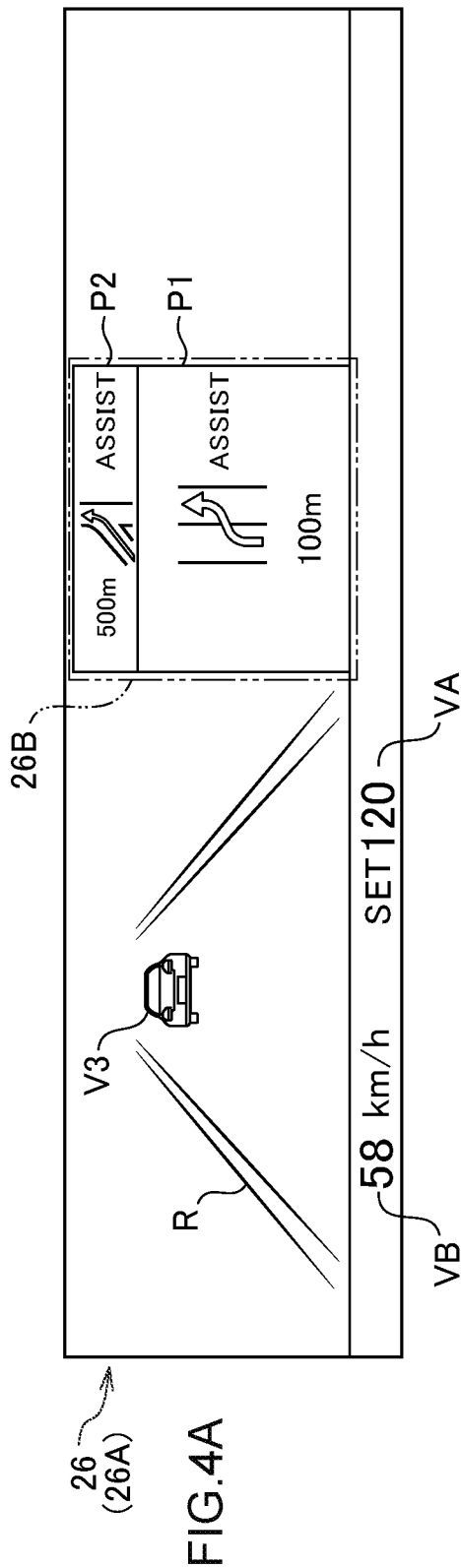
FIG. 4A is a diagram illustrating a display example of a second display section.
Figure 4B:
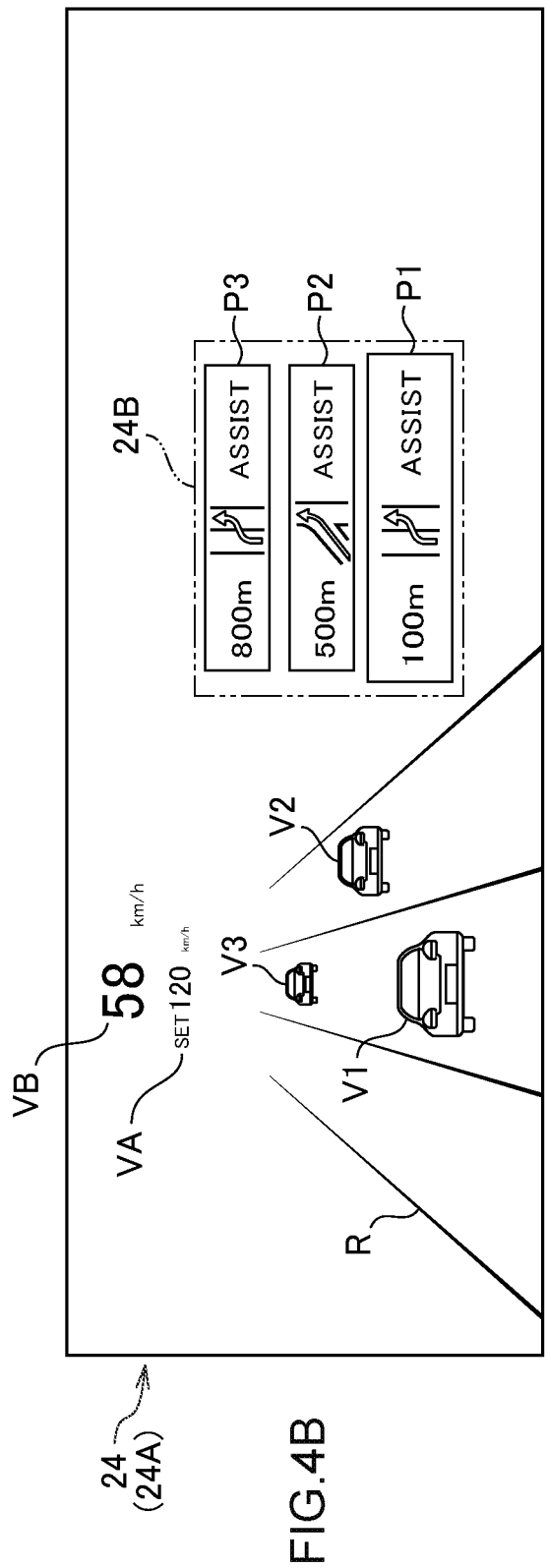
FIG. 4B is a diagram illustrating a display example of a first display section.

As illustrated in FIG. 4B, a set speed VA during cruise control and a current vehicle speed VB of the vehicle 12 are displayed at an upper portion of a display area 24A of the first display section 24. The set speed VA and the vehicle speed VB are displayed on the left side of the display area 24A of the first display section 24 in the vehicle width direction. The set speed VA is displayed in a small size at the lower row, and here, as an example, is set to 120 km/h. Further, the current vehicle speed VB is displayed at the upper row, and is displayed as 58 km/h. As a result, the vehicle 12 is set so as to travel at a speed of up to 120 km/h while maintaining a constant vehicle-to-vehicle distance from a vehicle ahead.

On the left side of the display area 24A of the first display section 24, an image V1 simulating the host vehicle and an image V2 and an image V3 which simulate peripheral vehicles are displayed on the road image R. By viewing the image V1, it is understood that the host vehicle is travelling in the middle lane of the three lanes of the road image R. Further, the image V2 and the image V3 are respectively displayed based on information detected by non-illustrated sensors installed at the vehicle 12. By viewing the image V2 and the image V3, it is understood that a vehicle is travelling diagonally ahead and to the right of the host vehicle and a vehicle is travelling in front of the host vehicle. Note that the position of the host vehicle can be detected by a GPS device installed at the vehicle 12. Further, as sensors that detect peripheral vehicles, sensors such as a stereo camera, an ultrasonic sensor, a millimeter-wave radar, or a laser radar are used in combination. Alternatively, configuration may be made such that the position of the host vehicle and the position of peripheral vehicles can be understood by performing inter-vehicle communication with the peripheral vehicles.

A specific display region 24B in which a plan for the vehicle 12 is displayed by the first display instructing section 56 is set on the right side of the display area 24A of the first display section 24, and plural plans scheduled to be implemented are displayed within the specific display region 24B. In the present exemplary embodiment, as an example, three plans, namely a first plan P1, a second plan P2, and a third plan P3 are displayed in this order from the bottom. Moreover, the respective plans display three information items: the distance from the current position to the scheduled implementation position of an operation; the scheduled travel route; and the type of driving. The type of driving referred to herein refers to a type of operation performed manually by a driver or performed during autonomous driving. Further, although in the present exemplary embodiment, as an example, only the immediate three plans are displayed, and the plans following thereafter are not displayed, there is no limitation thereto. For example, four or more plans may be displayed at the first display section 24. Further, the number of plans (in this regard, plural) to be displayed at the first display section 24 may be arbitrarily set.

Hereinafter, detailed explanation follows regarding the first plan P1, the second plan P2, and the third plan P3.

As illustrated in FIG. 4B, "100 m" is displayed at the left of the first plan P1, indicating that the operation is to be performed approximately 100 m ahead of the current position. Further, in the middle of the first plan P1, a lane change from a left lane to a right lane is displayed in a schematic diagram, and this schematic diagram enables the scheduled travel route to be understood. Moreover, on the right side of the first plan P1, "ASSIST" is displayed, indicating that the operation is to be performed (implemented) by autonomous driving (driving assistance control).

Note that the first plan P1 is displayed slightly enlarged relative to the second plan P2 and the third plan P3 described below. Moreover, the first plan P1 corresponds to the "top plan".

The second plan P2 is displayed above the first plan P1. On the left of the second plan P2, "500 m" is displayed, indicating that the operation is to be performed (implemented) approximately 500 m ahead of the current position. Further, in the middle of the second plan P2, a route in which a main road is joined from a left side-road is displayed in a schematic diagram, and this schematic diagram enables the scheduled travel route to be understood. Moreover, on the right side of the second plan P2, "ASSIST" is displayed, indicating that the operation is to be performed (implemented) by autonomous driving (driving assistance control).

The third plan P3 is displayed above the second plan P2. On the left of the third plan P3, "800 m" is displayed, indicating that the operation is to be performed (implemented) approximately 800 m ahead of the current position. Further, in the middle of the third plan P3, a lane change from a left lane to a right lane is displayed in a schematic diagram, and this schematic diagram enables the scheduled travel route to be understood. Moreover, on the right side of the third plan P3, "ASSIST" is displayed, indicating that the operation is to be performed by autonomous driving (driving assistance control).

Note that the third plan P3 corresponds to the "last plan".

Although all of the first plan P1 to the third plan P3 are operations performed by autonomous driving, in a case of an operation to be performed by manual driving, "MANUAL" is displayed on the right side of each plan instead of "ASSIST".

Figure 5A:
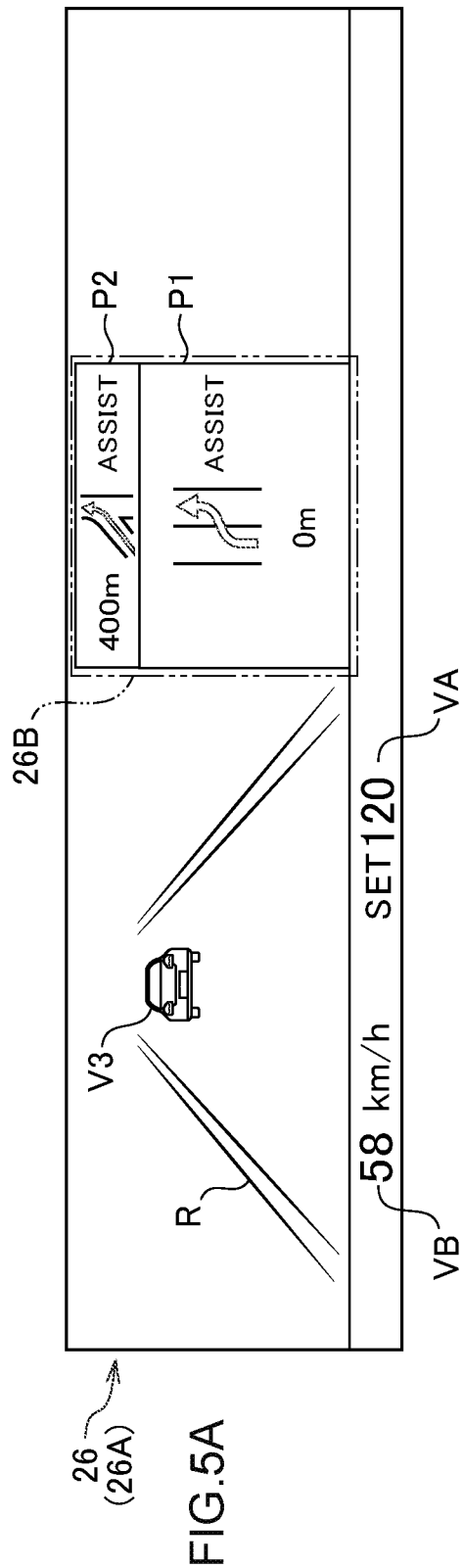
FIG. 5A is a diagram illustrating a display example of the second display section in a state 100 m ahead of the state illustrated in FIG. 4A.
Figure 5B:
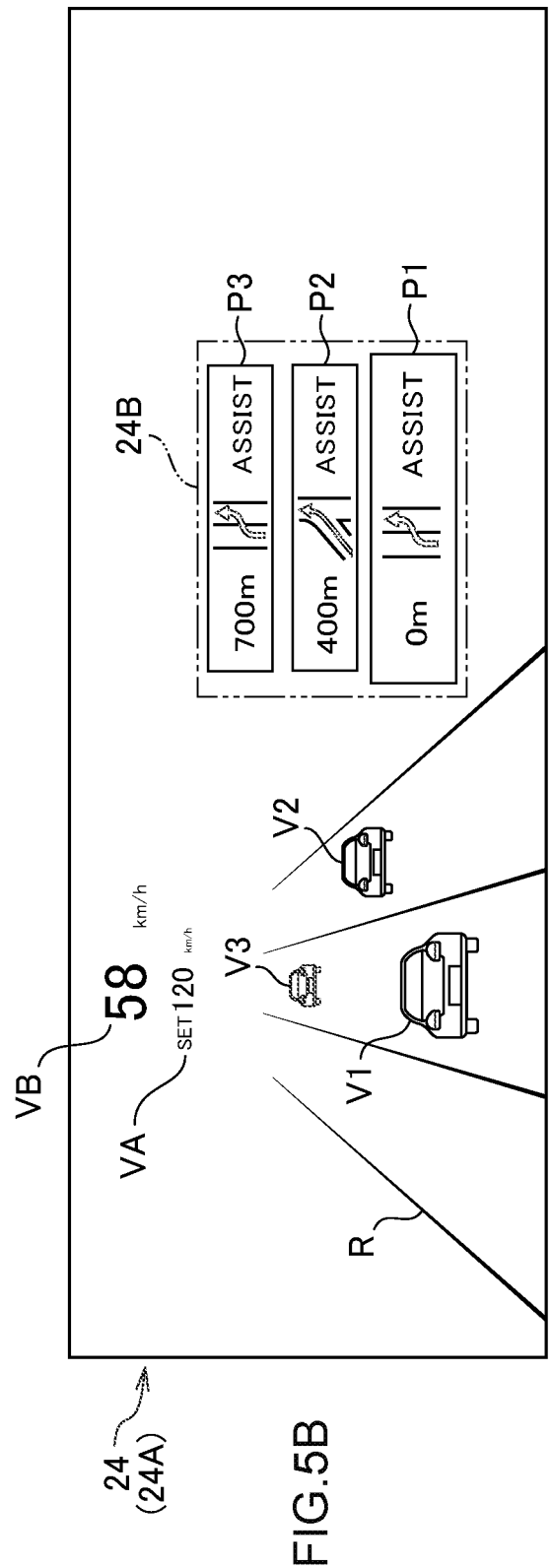
FIG. 5B is a diagram illustrating a display example of the first display section in a state 100 m ahead of the state illustrated in FIG. 4B.

FIG. 5B illustrates an image of the first display section 24 in a state in which the vehicle 12 has traveled approximately 100 m from the state illustrated in FIG. 4B. As illustrated in FIG. 5B, the indication on the left of the first plan P1 has been changed to "0 m", and the indication on the left of the second plan P2 has been changed to "400 m". Further, the indication on the left of the third plan P3 has been changed to "700 m".

Other display content is the same as in FIG. 4B.

FIG. 10B illustrates a state in which the first plan P1 is removed from the state illustrated in FIG. 5B, the second plan P2 and the third plan P3 are each moved down one row, and a fourth plan P4 scheduled to be implemented next after the third plan P3 is displayed above the third plan P3.

On the left of the fourth plan P4, "1.5 km" is displayed, indicating that the operation is to be performed (implemented) approximately 1.5 km ahead of the current position. Further, in the middle of the fourth plan P4, a route in which a main road is joined from a right side-road is displayed in a schematic diagram, and this schematic diagram enables the scheduled travel route to be understood. Moreover, on the right side of the fourth plan P4, "ASSIST" is displayed, indicating that the operation is to be performed (implemented) by autonomous driving (driving assistance control).

Other display content is the same as in FIG. 5B.

Figure 6A:
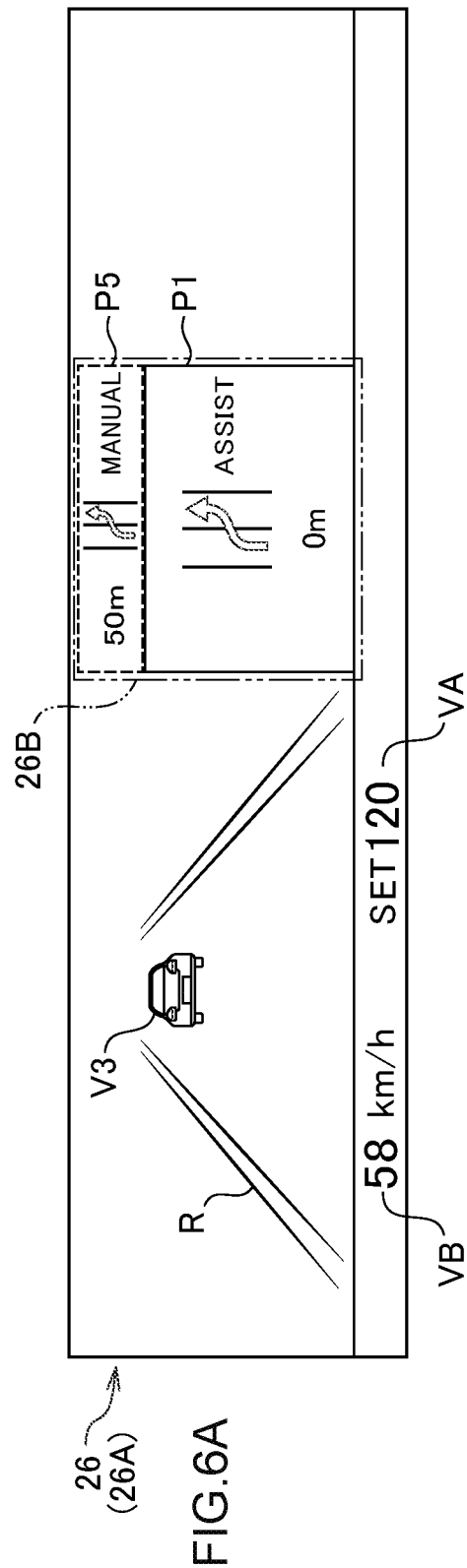
FIG. 6A is a diagram illustrating a display example of the second display section in a state in which an alternative plan has been inserted from the state illustrated in FIG. 5A.
Figure 6B:
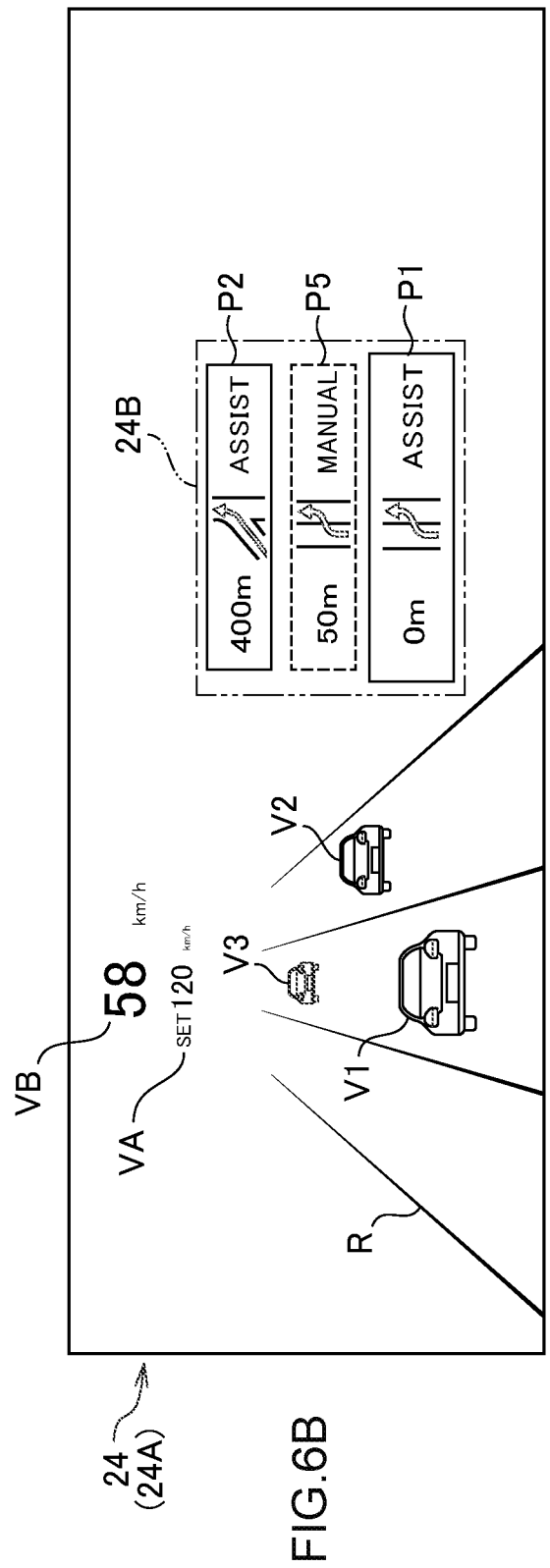
FIG. 6B is a diagram illustrating a display example of the first display section in a state in which an alternative plan has been inserted from the state illustrated in FIG. 5B.

FIG. 6B is a diagram illustrating a state in which a fifth plan P5 that might replace the first plan P1 is displayed between the first plan P1 and the second plan P2 in a case in which the detection section 55 detects that the operation of the first plan P1 has not been started at the scheduled implementation position of the first plan P1, which is the position illustrated in FIG. 5B.

In FIG. 6B, the fifth plan P5 is displayed above the first plan P1. On the left of the fifth plan P5, "50 m" is displayed, indicating that the operation might be performed (implemented) approximately 50 m ahead of the current position. Further, in the middle of the fifth plan P5, a lane change from a left lane to a right lane is displayed in a schematic diagram, and this schematic diagram enables the scheduled travel route to be understood. Moreover, on the right side of the fifth plan P5, "MANUAL" is displayed, indicating that the operation is to be performed by manual driving.

The fifth plan P5 is different from the other plans (the first plan P1 and the second plan P2), in that it is displayed grayed out (light gray) in the specific display region 24B. This is illustrated in FIG. 6B by the dashed outline of the fifth plan P5. This indicates that this is not a plan scheduled to be implemented at this stage (there is a possibility that this could become a plan scheduled to be implemented), and indicates that this is an alternative plan to the first plan P1 positioned below the fifth plan P5.

Other display content is the same as in FIG. 5B.

Figure 7A:
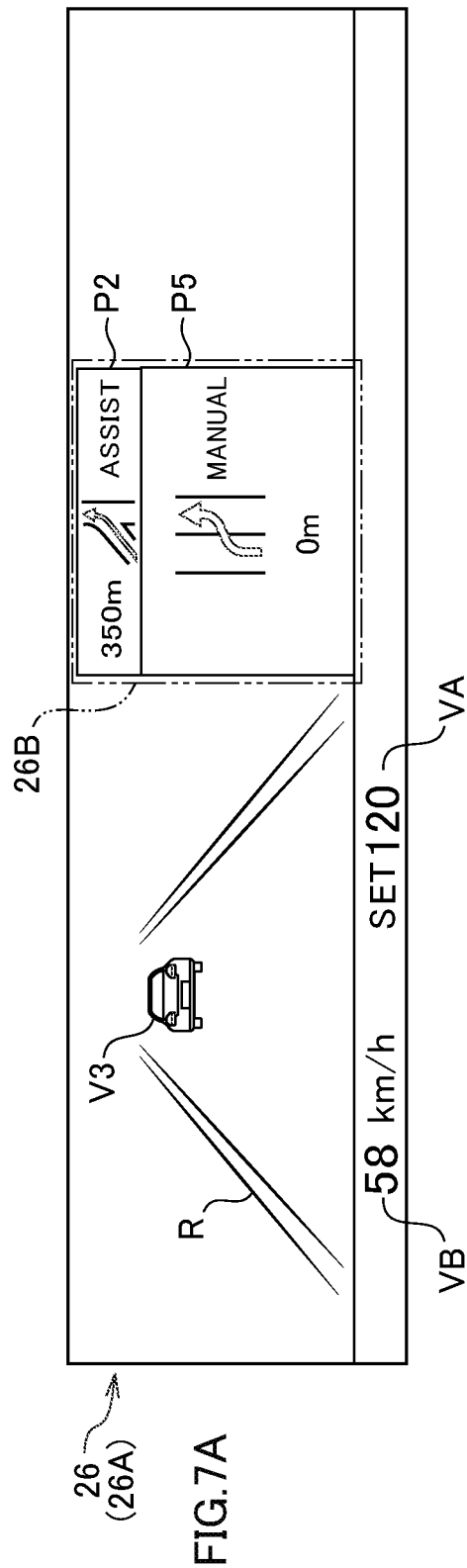
FIG. 7A is a diagram illustrating a display example after alternative processing of the second display section in a state 50 m ahead of the state illustrated in FIG. 6A.
Figure 7B:
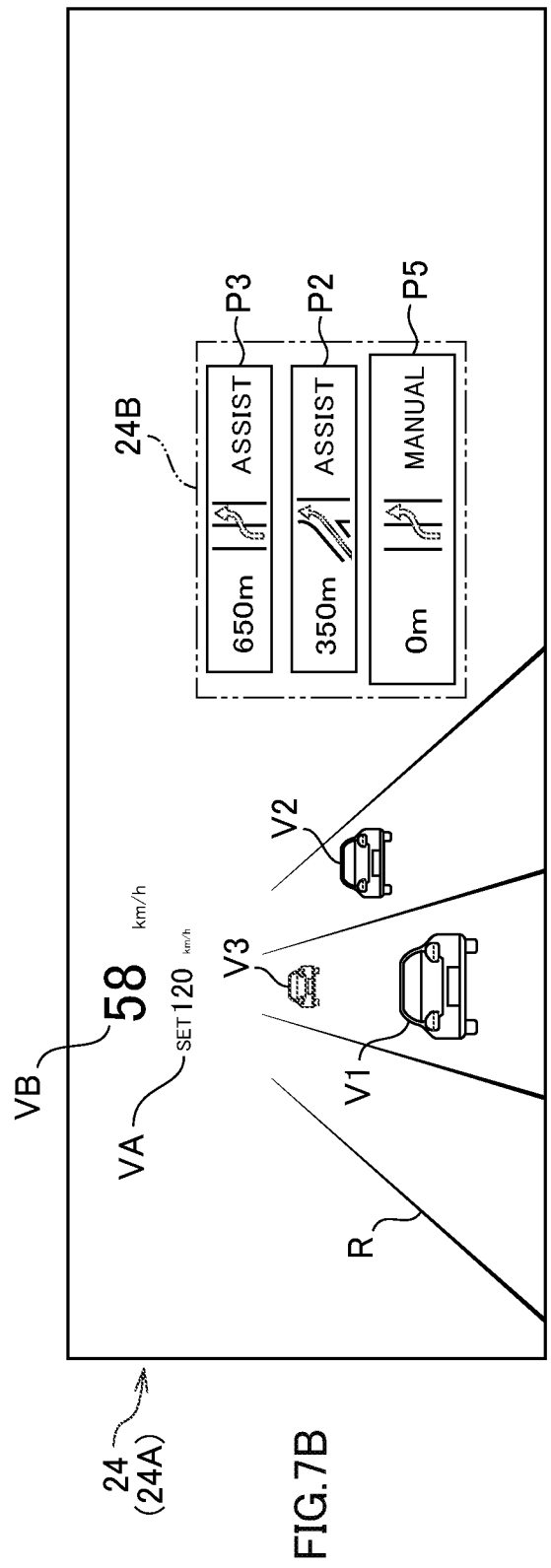
FIG. 7B is a diagram illustrating a display example after alternative processing of the first display section in a state 50 m ahead of the state illustrated in FIG. 6B.

FIG. 7B illustrates an image of the first display section 24 in a state in which the vehicle 12 has traveled approximately 50 m from the state illustrated in FIG. 6B.

As illustrated in FIG. 7B, in the specific display region 24B, the first plan P1 has been removed from the state illustrated in FIG. 6B, the fifth plan P5 and the second plan P2 have moved downward, and the third plan P3 that had been removed by the addition of the fifth plan P5 is restored and displayed at the very top row.

Further, the fifth plan P5 that was grayed out is displayed in the same manner as the other plans (the second plan P2 and the third plan P3).

The indications on the left of the fifth plan P5, the second plan P2, and the third plan P3 are changed to "0 m", "350 m", and "650 m", respectively.

Namely, since the operation of the first plan P1 could not be started even after passing through the scheduled implementation position of the first plan P1, the fifth plan P5 of manual driving, which is an alternative plan, is implemented.

Note that in a case in which the first plan P1 has been successfully implemented after passing the scheduled implementation position, the state illustrated in FIG. 5B is restored.

Other display content is the same as in FIG. 6B.

Next, explanation follows regarding the second display instructing section 58.

As illustrated in FIG. 3, the functional configuration of the vehicle display device 10 includes a second display instructing section 58. The second display instructing section 58 is a configuration that causes display of, at the the second display section 26, the two plans for which the scheduled implementation is the earliest among the plans that are caused to be displayed at the first display section 24 by the first display instructing section 56.

The emphasizing display section 60 has a function of emphasizing (enlarging) a plan (hereinafter referred to as the "top plan") for which the scheduled implementation is the earliest when displaying plural plans in each of the specific display regions 24B and 26B of the first display section 24 and the second display section 26, respectively, rather than other plans.

As a result of the functionality of the emphasizing display section 60, in the specific display region 24B of the first display section 24, as illustrated in FIG. 4B, the first plan P1 (see FIG. 4B) and the fifth plan P5 (see FIG. 7B), which are the top plans, are displayed slightly enlarged relative to the other plans. For example, the enlargement is about 110%.

On the other hand, when causing display of plural plans at the second display section 26, the emphasizing display section 60 causes display of the most immediate plan at the second display section 26 in an emphasized manner relative to the other plans.

Explanation follows regarding the functionality of the second display instructing section 58 and the emphasizing display section 60, with reference to FIG. 4A to FIG. 7A and FIG. 10A. Note that the same reference numerals are allocated to images displayed at the second display section 26 that are approximately the same as those displayed at the first display section 24, and detailed explanation thereof is omitted. Further, images displayed at the second display section 26 that are approximately the same as those displayed at the first display section 24 are displayed with synchronized content to the display at the first display section 24.

As illustrated in FIG. 4A, a set speed VA during cruise control and a current vehicle speed VB of the vehicle 12 are displayed at a lower portion of the display area 26A of the second display section 26. The set speed VA and the vehicle speed VB are displayed on the left side of the display area 26A of the second display section 26 in the vehicle width direction. The set speed VA is displayed on the right side, and here, as an example, is set to 120 km/h. Further, the current vehicle speed VB is displayed on the left side, and is displayed as 58 km/h. As a result, the vehicle 12 is set so as to travel at a speed of up to 120 km/h while maintaining a constant vehicle-to-vehicle distance from a vehicle ahead. Note that the display of the set speed VA and the vehicle speed VB is synchronized with the content of the first display section 24.

The specific display region 26B, in which a plan for the vehicle 12 is displayed, is set on the right side of the display area 26A of the second display section 26 by the second display instructing section 58, and plural plans scheduled to be implemented (the immediate first plan P1 and the second plan P2 scheduled to be implemented next after the first plan P1) are displayed within the specific display region 26B. The first plan P1, which is the most immediate plan, is displayed at the lower side. As illustrated in FIG. 4A, this first plan P1 is displayed in an enlarged manner relative to other plan (the second plan P2), the distance 100 m until the first plan P1 is displayed at the lower side, a schematic diagram of a lane change from a left lane to a right lane is illustrated above the distance 100 m, and "ASSIST" that indicates autonomous driving is displayed on the right side of the schematic diagram.

The second plan P2 is displayed above the first plan P1 at the display area 26A of the second display section 26.

FIG. 5A is a diagram illustrating a state at a position at which the vehicle 12 has advanced 100 m from the state illustrated in FIG. 4A.

FIG. 10A illustrates a state in which the first plan P1 is removed from the state illustrated in FIG. 5A, the second plan P2 is moved downward, and the third plan P3 scheduled to be implemented next after the second plan P2 is displayed above the second plan P2.

Other display content is approximately the same as in FIG. 5A.

FIG. 6A is a diagram illustrating a state in which the fifth plan P5 is inserted above the first plan P1 after the second plan P2 has been removed from the display area 26A of the second display section 26 in FIG. 5A.

FIG. 7A is a diagram illustrating a state at a position at which the vehicle 12 has advanced 50 m from the state illustrated in FIG. 6A. In the case of this figure, the first plan P1 could not be implemented at the scheduled implementation position, and due to the first plan P1 not being able to be implemented even though implementation was attempted thereafter, it was determined that the first plan P1 could not be implemented and the fifth plan P5 was set as the plan scheduled to be implemented.

Accordingly, the state in which the fifth plan P5 was displayed grayed out is changed to a display state similar to the other plan (the second plan P2).

(Operation)

Next, explanation follows regarding operation of the present exemplary embodiment.

(Display Processing)

Figure 8:
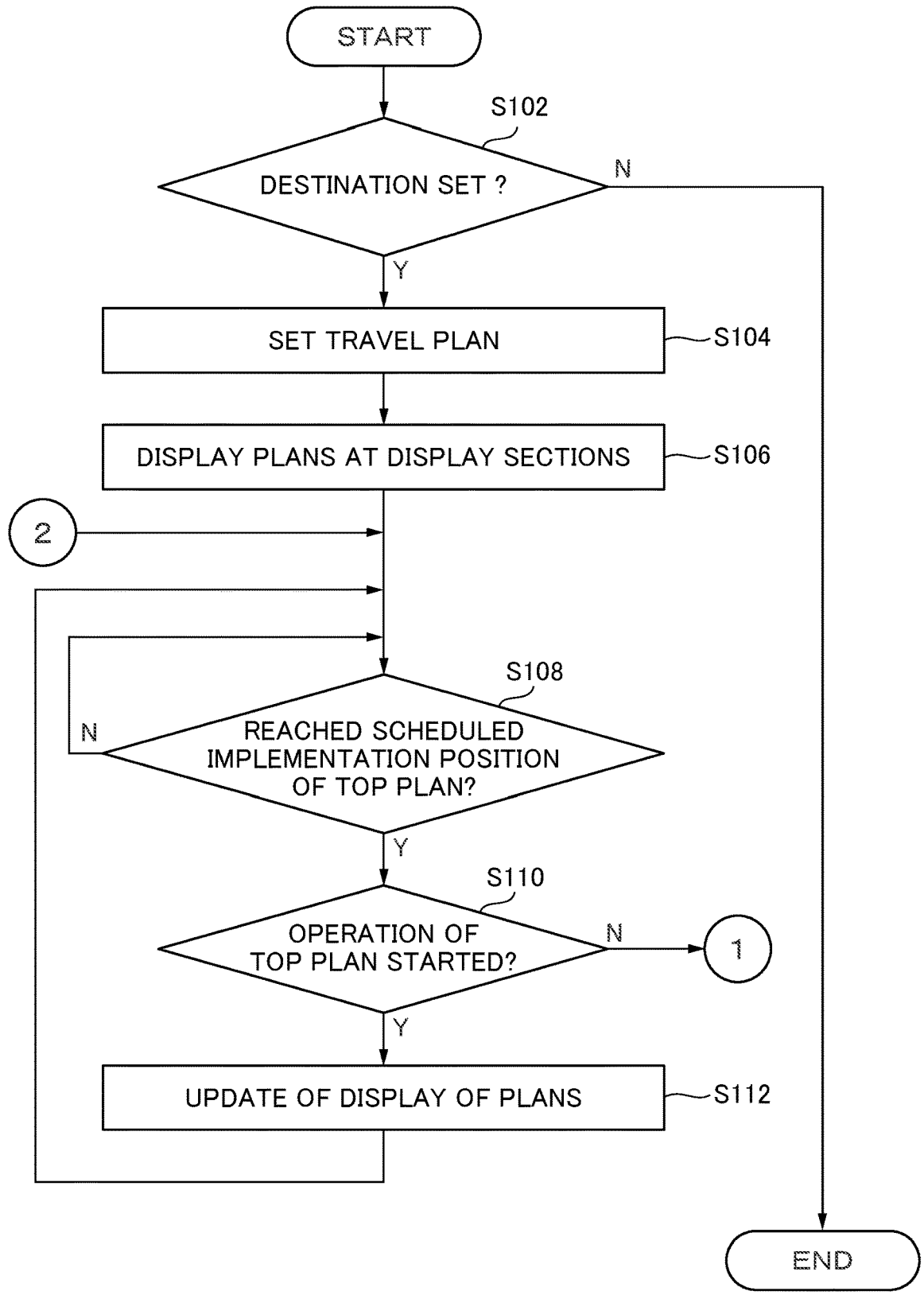
FIG. 8 is a flowchart illustrating an example of a flow of display processing in an exemplary embodiment.
Figure 9:
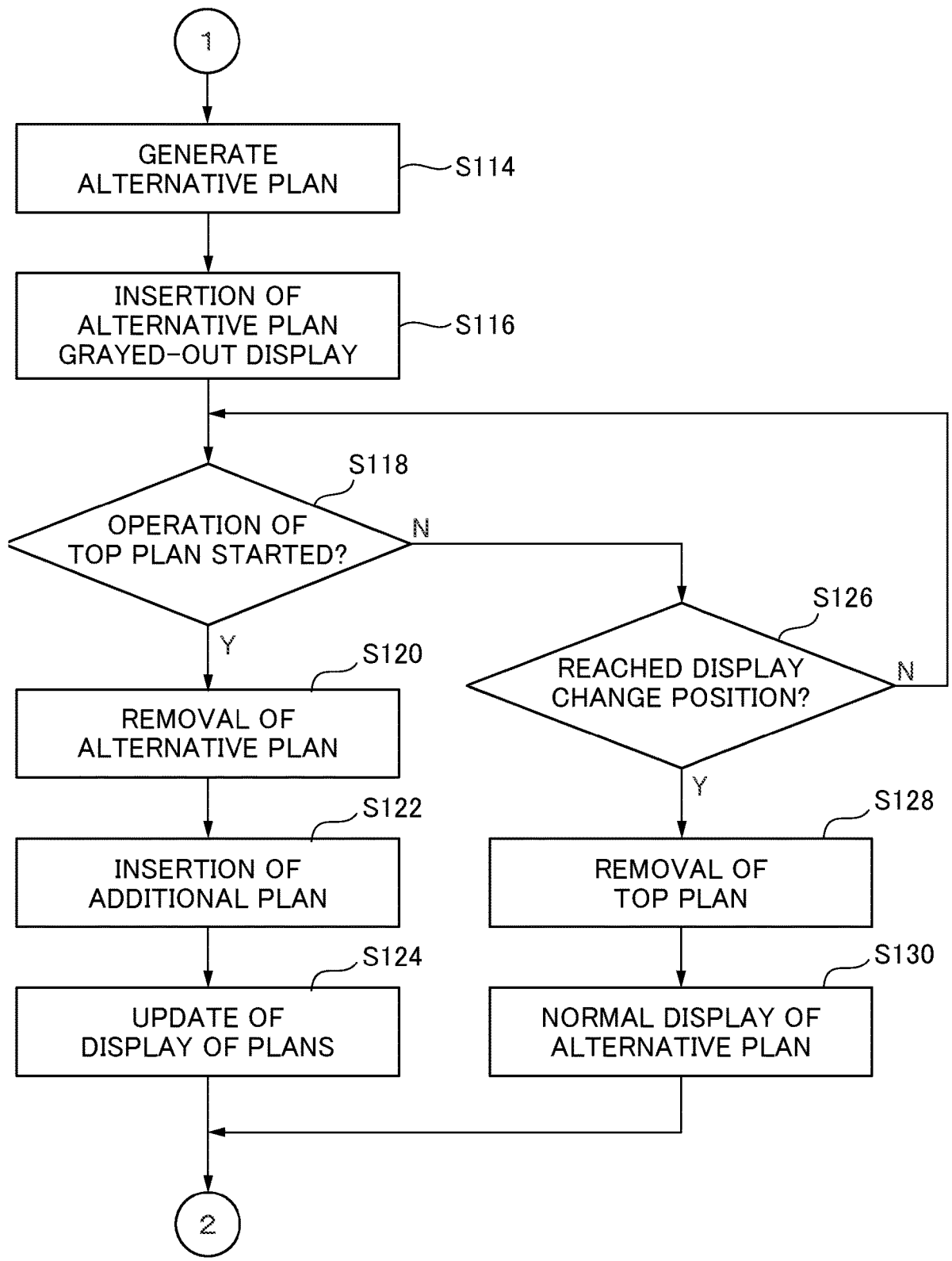
FIG. 9 is a flowchart illustrating an example of a flow of display processing in the exemplary embodiment.

Explanation follows regarding an example of display processing to cause display of a plan for the vehicle 12 based on a travel plan, with reference to the flowcharts illustrated in FIG. 8 and FIG. 9. The display processing is executed by the CPU 30 reading a display program from the ROM 32 or the storage 36, and loading and executing the display program in the RAM 34.

As illustrated in FIG. 8, the CPU 30 determines whether or not a destination has been set at step S102. The destination may be directly input to the vehicle 12 by an occupant or indirectly input via a portable terminal or the like.

At step S102, in a case in which the CPU 30 determines that the destination has been set, the processing transitions to step S104. At step S102, in a case in which the CPU 30 determines that the destination has not been set, the CPU 30 ends the display processing.

At step S104, the CPU 30 sets a travel plan for the vehicle 12. More specifically, the CPU 30 sets a travel plan from the current location to the destination using the functionality of the travel plan setting section 52. Information relating to traffic conditions and accidents and the like may be acquired and reflected when a travel plan is set. Further, the travel plan may be set so as to increase autonomous driving in accordance with a request from an occupant which is input in advance.

At step S106, the CPU 30 causes the first display section 24 and the second display section 26 to display plans. More specifically, based on the travel plan, the CPU 30 causes the first display section 24 and the second display section 26 to respectively display plans for the vehicle 12 using the functionality of the first display instructing section 56 and the second display instructing section 58.

As an example, as illustrated in FIG. 4B, the CPU 30 causes three plans, namely, the first plan P1, the second plan P2, and the third plan P3, to be displayed at the specific display region 24B set to the right side of the display area 24A of the first display section 24. Similarly, as illustrated in FIG. 4A, the CPU 30 causes two plans, namely, the first plan P1 and the second plan P2, to be displayed at the specific display region 26B set to the right side of the display area 26A of the second display section 26.

At this time, as illustrated in FIG. 4B, the CPU 30 uses the functionality of the emphasizing display section 60 to display the first plan P1, which is the top plan, at the specific display region 24B of the first display section 24 in a slightly enlarged manner relative to the display of the other plans (the second plan P2 and the third plan P3).

Similarly, as illustrated in FIG. 4A, the CPU 30 uses the functionality of the emphasizing display section 60 to display the first plan P1, which is the top plan, at the specific display region 26B of the second display section 26 in an enlarged manner relative to the display of the other plan (the second plan P2).

At step S108, the CPU 30 uses the functionality of the detection section 55 to determine whether or not the vehicle 12 has reached the scheduled implementation position of the operation of the top plan (the first plan P1). For example, the current position of the vehicle 12 is confirmed using the functionality of the communication section 50 and the like, and it is determined whether or not the vehicle 12 has reached the scheduled implementation position of the operation.

In a case in which the CPU 30 makes an affirmative determination at step S108, the processing transitions to step S110. On the other hand, in a case in which the CPU 30 makes a negative determination at step S108, the CPU 30 waits until an affirmative determination is made.

At step S110, the CPU 30 uses the functionality of the detection section 55 to determine whether or not the operation of the top plan (the first plan P1) has been started. Whether or not the operation (lane change control (driving assistance control)) of the first plan P1, which is the top plan, among the plans P1 to P3 displayed at the first display section 24 illustrated in FIG. 4B has been started is determined from drive signals and the like for the actuator 46. For example, in a case of a lane change, the detection section 55 detects a blinking drive signal from a direction indicator to determine that the lane change control (driving assistance control), which is the first plan P1, has been started.

In a case in which the CPU 30 makes an affirmative determination at step S110, the processing transitions to step S112, while in a case in which the CPU 30 makes a negative determination, the processing transitions to step S114.

At step S112, the CPU 30 uses the functionality of the first display instructing section 56 and the second display instructing section 58 to update the display of the plans in the specific display regions 24B and 26B of the first display section 24 and the second display section 26.

More specifically, as illustrated in FIG. 10B, in the specific display region 24B, the display of the first plan P1, which is the top action plan, is removed from the state illustrated in FIG. 5B, the second plan P2 and the third plan P3 are each moved to a position down one row, and the fourth plan P4 scheduled to be implemented next after the third plan P3 is newly displayed at the top.

Further, as illustrated in FIG. 10A, in the specific display region 26B, the display of the first plan P1, which is the top action plan, is removed from the state illustrated in FIG. 5A, the second plan P2 is moved downward and displayed in an enlarged manner, and the third plan P3 is newly displayed above the second plan P2.

Hereinafter, similar display control is referred to as "update of display of the plans", and detailed explanation thereof is omitted.

When the display of the plans of the first display section 24 and the second display section 26 are updated at step S112 as described above, the processing returns to step S108.

On the other hand, at step S114 in FIG. 9, the CPU 30 uses the functionality of the travel plan setting section 52 to generate an alternative plan that might be implemented instead of the first plan P1, which is the top plan. The fifth plan P5, which is an alternative plan, is similar to the first plan P1, with the following differences.

Namely, the scheduled implementation position of the fifth plan P5 is 50 m further away than the first plan P1. Further, the first plan P1 is autonomous driving (see FIG. 6A and FIG. 6B, and "ASSIST" notation), while the fifth plan P5 is manual driving (see FIG. 6A and FIG. 6B, and "MANUAL" notation).

Next, at step S116, the CPU 30 displays (inserts) the fifth plan P5 in the respective specific display regions 24B and 26B of the first display section 24 and the second display section 26 using the functionality of the first display instructing section 56 and the second display instructing section 58.

More specifically, as illustrated in FIG. 6B, in the specific display region 24B of the first display section 24, the third plan P3 is removed from the state illustrated in FIG. 5B, the second plan P2 is moved upward, and the fifth plan P5 is inserted and displayed between the first plan P1 and the second plan P2. At this time, the fifth plan P5 is displayed grayed out (light gray).

Similarly, as illustrated in FIG. 6A, in the specific display region 26B of the second display section 26, the second plan P2 is removed from the state illustrated in FIG. 5A, and the fifth plan P5 is displayed above the first plan P1. At this time, the fifth plan P5 is displayed grayed out (light gray).

By the fifth plan P5 being displayed grayed out in this manner, it is indicated that although the fifth plan P5 is not a plan scheduled to be implemented at this stage, there is a possibility of substituting in the fifth plan P5 in a case in which the first plan P1 cannot be implemented.

Further, the fifth plan P5 is displayed immediately above the first plan P1 to indicate that it is an alternative plan to the first plan P1.

Next, at step S118, the CPU 30 uses the functionality of the detection section 55 to determine whether or not the operation of the top plan (the first plan P1) has been started.

This is a determination as to whether or not the operation of the top plan can be implemented while the vehicle 12 is traveling a further predetermined distance (for example, to a display change position, described below) even though the vehicle 12 has passed a scheduled implementation point of the top plan (for example, the first plan P1).

In a case in which the CPU 30 makes an affirmative determination at step S118, the processing transitions to step S120, while in a case in which the CPU 30 makes a negative determination, the processing transitions to step S126.

Next, at steps S120 and S122, the CPU 30 uses the functionality of the first display instructing section 56 and the second display instructing section 58 to remove the first plan P5, which is an alternative plan, from the respective specific display regions 24B and 26B of the first display section 24 and the second display section 26, and also adds a plan that is scheduled to be implemented next.

More specifically, as illustrated in FIG. 5B, in the specific display region 24B, the display of the fifth plan P5 is removed from the state illustrated in FIG. 6B, the second plan P2 is moved down one row, and the third plan P3 is displayed above the second plan P2.

Similarly, as illustrated in FIG. 5A, in the specific display region 26B, the display of the fifth plan P5 is removed from the state illustrated in FIG. 6A, and the second plan P2 is displayed above the first plan P1.

Next, at step S124, the CPU 30 uses the functionality of the first display instructing section 56 and the second display instructing section 58 to update the display of the plans at the specific display regions 24B and 26B after a predetermined amount of time has elapsed from the start of the operation of the top plan.

This is because although the display of the plans may be updated simultaneously with the start of the operation of the top plan, in this case, the display of the top plan (the first display plan P1) and the alternative plan (the fifth plan P5) is lost at one time from the specific display regions 24B and 26B, and there is a possibility of confusing an occupant.

When the update of display of the plans has ended at step S124, the processing returns to step S108.

At step S126, the CPU 30 uses the functionality of the detection section 55 to determine whether or not the vehicle 12 has reached the display change position. For example, the current position of the vehicle 12 is confirmed using the functionality of the communication section 50 or the like, and it is determined whether or not the vehicle 12 has reached the display change position.

Note that the display change position is a position at which the implementation of the top plan is abandoned and a determination is made to set the alternative plan as the plan scheduled to be implemented, and a position ahead of the scheduled implementation position of the alternative plan is set.

In a case in which the CPU 30 makes a negative determination at step S126, processing returns to step S118. This is the purpose of trying to determine whether or not the operation of the top plan can be started until the vehicle 12 reaches the display change position.

On the other hand, in a case in which the CPU 30 makes an affirmative determination at step S126, the processing transitions to step S128.

At steps S128 and S130, the CPU 30 uses the functionality of the first display instructing section 56 and the second display instructing section 58 to perform display change of setting the alternative plan as the plan scheduled to be implemented.

More specifically, as illustrated in FIG. 7B, in the specific display region 24B, the display of the first plan P1 is removed from the state illustrated in FIG. 6B, the fifth plan P5 and the second plan P2 are each moved down one row, and the third plan P3 is displayed above the second plan P2.

Similarly, as illustrated in FIG. 7A, in the specific display region 26B, the display of the first plan P1 is removed from the state illustrated in FIG. 6A, the fifth plan P5 is moved downward, and the second plan P2 is displayed above the fifth plan P5.

Note that the states illustrated in FIG. 7A and FIG. 7B are displays when the vehicle 12 has reached the scheduled implementation position of the fifth plan P5.

In this manner, when the display change of the plans has been completed in steps S128 and S130, the processing returns to step S108.

In this manner, in a case in which there is a possibility that the top plan (for example, the first plan P1) displayed at the specific display regions 24B and 26B at the first display section 24 and the second display section 26 might not be able to be implemented, since the alternative plan (for example, the fifth plan P5) for the top plan is displayed, the occupant can understand in advance that the fifth plan P5 might be scheduled to be implemented instead of the first plan.

Moreover, since the alternative plan (for example, the fifth plan P5) is displayed in a different color (for example, light gray) to other plans, the occupant can intuitively understand that this is not a plan scheduled to be implemented at this stage, but rather a plan that might be scheduled to be implemented.

In particular, since the alternative plan (for example, the fifth plan P5) is displayed grayed out, it is easy for the occupant to intuitively understand that the plan is not scheduled to be implemented at the present stage.

Moreover, in the present exemplary embodiment, if the operation of the top plan has not been started at the point in time at which the vehicle 12 reaches the scheduled implementation position of the top plan (for example, the first plan P1), it is determined that the possibility of implementation of the top plan is low, and the alternative plan is displayed.

Namely, the alternative plan is not displayed at the timing at which the alternative plan is implemented, but rather is displayed at a point in time at which there is a high possibility of the alternative plan being implemented (at a point in time at which it is determined that the top plan cannot be implemented), in other words, from ahead of the scheduled implementation position of the alternative plan, and therefore, the occupant can understand the possibility of implementing the alternative plan by visually recognizing the alternative plan.

Moreover, since the scheduled implementation position of the alternative plan is set further away than the scheduled implementation position of the top plan, even in a case in which operation is not started at the scheduled implementation point of the top plan, there is no immediate switch to implementation of the alternative plan, and this enables the possibility of starting the operation of the top plan up until the scheduled implementation point of the alternative plan to be ensured.

Further, since the instrument panel 14 of the first display section 24 is disposed at an upper portion in front of an occupant in the driver's seat, the second display section 26 is provided in front of the occupant in the driver's seat at the windshield glass 18. Accordingly, the occupant in the driver's seat can visually recognize the update of the plans displayed at the specific display regions 24B and 26B of the first display section 24 and the second display section 26 without excessively moving their line of sight. Namely, the occupant in the driver's seat can easily visually recognize the update of the plans.

In addition, since the vehicle 12 includes the vehicle display device 10, an occupant cannot implement the top plan, enabling the occupant to understand that there is a possibility that an alternative plan might be scheduled to be implemented. Namely, it is possible to understand in advance that an alternative plan must be implemented by manual driving instead of autonomous driving, enabling a calm response when implementing the alternative plan.

OTHER

Although explanation has been given regarding a vehicle display device and a display processing method according to the exemplary embodiments, obviously various embodiments may be implemented within a range not departing from the gist of the present disclosure. For example, in the exemplary embodiments described above, the first display section 24 is provided at an instrument panel facing a driver's seat, and the second display section 26 is a projection plane projected by the head-up display device 44. However, there is no limitation thereto. Namely, the first display section may be a center display provided at a center section in the vehicle width direction of the instrument panel 14. Further, the second display section may be provided at the instrument panel 14 at a vehicle forward side of the steering wheel 16.

Furthermore, although in the exemplary embodiments, the top plan is displayed in an enlarged manner in each of the specific display regions 24B and 26B of the first display section 24 and the second display section 26 by the functionality of the emphasizing display section 60, this is not required. Namely, all of the plural plans may be displayed in the same size at the respective specific display regions 24B and 26B of the first display section 24 and the second display section 26.

In addition, in the present exemplary embodiments, although an alternative plan is displayed at the specific display regions 24B and 26B in a case in which the vehicle 12 has reached the scheduled implementation position of the first plan P1 and the operation of the first plan P1 has not been started, there is no limitation thereto.

For example, control may be performed based on time instead of the scheduled implementation position. Namely, the present disclosure is not limited to the position of the vehicle 12 as long as the scheduled implementation timing of the operation of the first plan P1 is specified.

Moreover, in a case in which the ECU 28 or the like detects a possibility that the operation of the top plan (for example, the first plan P1) cannot be implemented at a timing prior to the scheduled implementation timing, for example, the ECU 28 or the like detects traffic congestion information, accident information, or the like, an alternative plan (for example, the fifth plan P5) may be displayed prior to the scheduled implementation timing (the scheduled implementation position).

In addition, a configuration may be adopted in which an alternative plan is constantly displayed with respect to the top plan at the specific display regions 24B and 26B.

Although an alternative plan is displayed for the top plan in the exemplary embodiments, there is no limitation thereto. For example, an alternative plan may be displayed for the second plan (for example, the second plan P2) that follows the top plan. Namely, in a case in which it is detected from the traffic congestion information or the like that a merging point is congested, it is also conceivable to display an alternative plan to the second plan (which is not the top plan), which is a merging operation.

Moreover, in the exemplary embodiments, although the alternative plan is displayed grayed out in the specific display regions 24B and 26B and is displayed in the same manner as the other plans when the scheduled implementation has been decided, there is no limitation thereto. When an alternative is possible, the alternative plan may be displayed in a different manner (for example, with a different color) to the other plans.

Moreover, in the exemplary embodiments, when an alternative plan is added to the specific display regions 24B and 26B, after the alternative plan is displayed outside the specific display regions 24B and 26B in the respective display areas 24A and 26A, the alternative plan may be moved (fade-in processing) inside the specific display regions 24B and 26B from outside the specific display regions 24B and 26B.

Similarly, when an alternative plan or a top plan is removed from the specific display regions 24B and 26B, removal (fade-out processing) may be performed after moving the alternative plan or the top plan from inside the specific display regions 24B and 26B to the outside of the specific display regions 24B and 26B in the respective display areas 24A and 26A.

Moreover, in the exemplary embodiments, although a scheduled implementation distance is displayed for the alternative plan in the same manner as for the other plans, in a case in which the alternative plan is displayed grayed out, there is a possibility that the distance may be difficult to visually recognize, and therefore a configuration in which the scheduled implementation timing of the alternative plan is displayed using a progress bar or the like may be considered.

In addition, although the three information items including the distance until the operation of the vehicle 12, the scheduled travel route of the vehicle, and the type of driving are displayed as plans in the above exemplary embodiments, there is no limitation thereto. For example, information such as a speed limit may be displayed; however, from the viewpoint of making the display easier to see, it is preferable to display only the above-mentioned three information items. Further, the display of the scheduled travel route is not limited to the schematic diagrams illustrated in FIG. 4 to FIG. 7, and may be displayed using other icons or the like.

Moreover, although the second display instructing section 58 displays the two most immediate plans at the second display section 26 in the exemplary embodiments described above, there is no limitation thereto. For example, the second display instructing section 58 may display three or more immediate plans at the second display section 26.

Moreover, although in the above exemplary embodiments, plural plans are displayed from a lower side to an upper side in the order in which the plural plans are scheduled to be implemented at the specific display regions 24B and 26B of the first display section 24 and the second display section 26, there is no limitation thereto. For example, plural plans may be displayed from an upper side to a lower side in the order in which the plural plans are scheduled to be implemented at the specific display regions 24B and 26B of the first display section 24 and the second display section 26.

Further, although plural plans are displayed at the respective display areas 24A and 26A of the first display section 24 and the second display section 26 in the above exemplary embodiments, the second display section 26 may display only the most immediate top plan.

Note that the condition of the road displayed at the screen, and the type, distance or the like of the plan are described above for simplicity of explanation only, and may not coincide with the actual road surface condition.

Further, in the above-described embodiments, any of various types of processors other than CPU 30 may execute the display processing that the CPU 30 executes by reading software (programs). Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the display processing may be executed by one of these various types of processors, or may be executed by combining two or more of the same type or different types of processors (e.g., plural FPGAs, or a combination of a CPU and an FPGA, or the like). Further, a hardware configuration of the various processors is specifically formed as an electric circuit combining circuit elements such as semiconductor elements.

In addition, although various data is stored in the storage 36 in the above-described exemplary embodiments, there is no limitation thereto. For example, a storage section may be a recording medium such as a compact disc (CD), a digital versatile disc (DVD), or universal serial bus (USB) memory. In this case, various programs, data, and the like are stored in these recording media.

What is claimed is:

1. A vehicle display device comprising:
a display that is provided inside a vehicle cabin and that includes, at a display area, a specific display region that displays a plurality of plans scheduled to be implemented with respect to a vehicle, arranged in an order in which the plurality of plans are scheduled to be implemented; and
a processor configured to cause display of, between a first plan, which is one plan among the plurality of plans, and a second plan, which is scheduled to be implemented next after the first plan, at the specific display region, an alternative plan that has a possibility of being implemented instead of the first plan.

2. The vehicle display device according to claim 1, wherein the first plan is a top plan that is scheduled to be implemented first among the plurality of plans.

3. The vehicle display device according to claim 1, wherein:
the first plan is an operation of the vehicle by driving assistance control; and
in a case in which a predetermined condition relating to the first plan is satisfied, the processor is configured to cause display of the alternative plan, which is a manual operation of the vehicle of a same type as the first plan, at the specific display region.

4. The vehicle display device according to claim 1, wherein the processor is configured to cause display of the alternative plan in a color that is different from at least the first plan.

5. The vehicle display device according to claim 1, wherein, in a case in which the alternative plan is added and displayed at the specific display region, the processor is configured to cause a last plan, which is a plan scheduled to be implemented last among the plurality of plans, to be removed from the specific display region.

6. The vehicle display device according to claim 1, wherein, in a case in which operation of the first plan has started, the processor is configured to cause the alternative plan to be removed from the specific display region.

7. The vehicle display device according to claim 3, wherein the predetermined condition relating to the first plan is the operation of the vehicle relating to the first plan not starting at a scheduled implementation timing of the first plan.

8. The vehicle display device according to claim 3, wherein the predetermined condition relating to the first plan is a possibility of the operation of the vehicle relating to the first plan not starting at a scheduled implementation timing of the first plan.

9. The vehicle display device according to claim 1, wherein the display is provided at an instrument panel facing a driver's seat.

10. The vehicle display device according to claim 1, wherein the display is a projection plane projected by a head-up display device.

11. A vehicle comprising the vehicle display device according to claim 1.

12. A display processing method comprising:
causing display of a plurality of plans scheduled to be implemented with respect to a vehicle, arranged in an order in which the plurality of plans are scheduled to be implemented, at a specific display region of a display area at a display that is provided inside a vehicle cabin; and
causing display of, between a first plan, which is one plan among the plurality of plans, and a second plan, which is scheduled to be implemented next after the first plan, at the specific display region, an alternative plan that has a possibility of being implemented instead of the first plan.

13. A non-transitory computer-readable storage medium storing a program that is executable by a computer to perform processing, the processing comprising:
causing display of a plurality of plans scheduled to be implemented with respect to a vehicle, arranged in an order in which the plurality of plans are scheduled to be implemented, at a specific display region of a display area at a display that is provided inside a vehicle cabin; and causing display of, between a first plan, which is one plan among the plurality of plans, and a second plan, which is scheduled to be implemented next after the first plan, at the specific display region, an alternative plan that has a possibility of being implemented instead of the first plan.

* * * * *